United States Patent
Bouchet et al.

(10) Patent No.: US 10,683,097 B2
(45) Date of Patent: Jun. 16, 2020

(54) AIRCRAFT STRUT COMPRISING AT LEAST ONE LATERAL FRAME IN LATTICE FORM AND AIRCRAFT COMPRISING SAID STRUT

(71) Applicant: Airbus Operations S.A.S., Toulouse (FR)

(72) Inventors: Eric Bouchet, Aussonne (FR); Mélaine Chaix, Aucamville (FR)

(73) Assignee: Airbus Operations S.A.S. (FR)

( * ) Notice: Subject to any disclaimer, the term of this patent is extended or adjusted under 35 U.S.C. 154(b) by 408 days.

(21) Appl. No.: 15/619,722

(22) Filed: Jun. 12, 2017

(65) Prior Publication Data

US 2017/0361940 A1  Dec. 21, 2017

(30) Foreign Application Priority Data

Jun. 15, 2016 (FR) ..................................... 16 55528

(51) Int. Cl.
*B64D 27/26* (2006.01)
*B64D 27/18* (2006.01)

(52) U.S. Cl.
CPC .............. *B64D 27/26* (2013.01); *B64D 27/18* (2013.01); *B64D 2027/262* (2013.01); *B64D 2027/264* (2013.01)

(58) Field of Classification Search
CPC .. B64D 27/26; B64D 27/18; B64D 2027/262; B64D 2027/264; B64C 3/18; B64C 3/182
See application file for complete search history.

(56) References Cited

U.S. PATENT DOCUMENTS

| 10,351,254 B2* | 7/2019 | Journade ................. B64D 27/26 |
| 2005/0274485 A1* | 12/2005 | Huggins ................... B22C 9/22 |
| | | 164/349 |
| 2008/0217502 A1 | 9/2008 | Lafont |
| 2009/0294579 A1 | 12/2009 | Eve et al. |
| 2011/0036942 A1 | 2/2011 | Marche et al. |
| 2011/0121132 A1* | 5/2011 | Crook ..................... B64D 27/18 |
| | | 244/54 |
| 2011/0204179 A1 | 8/2011 | Skelly et al. |
| 2012/0104162 A1* | 5/2012 | West ..................... B64C 1/1453 |
| | | 244/54 |

FOREIGN PATENT DOCUMENTS

| FR | 2 889 505 A1 | 2/2007 |
| FR | 2 891 252 A1 | 3/2007 |
| FR | 2 934 845 A1 | 2/2010 |

OTHER PUBLICATIONS

FR 16 55528 Search Report dated Mar. 6, 2017.

* cited by examiner

*Primary Examiner* — Rodney A Bonnette
(74) *Attorney, Agent, or Firm* — Lerner, David, Littenberg, Krumholz & Mentlik, LLP

(57) ABSTRACT

An aircraft strut includes a primary structure which includes: a top stringer, a bottom stringer, at least one transverse frame which links the top stringer to the bottom stringer, a front end wall which links a front end of the top stringer to a front end of the bottom stringer, a rear end wall which links a rear end of the top stringer to a rear end of the bottom stringer, two lateral frames arranged on either side of the transverse frame, each lateral frame having a lattice form. An aircraft includes at least one strut described herein.

8 Claims, 2 Drawing Sheets

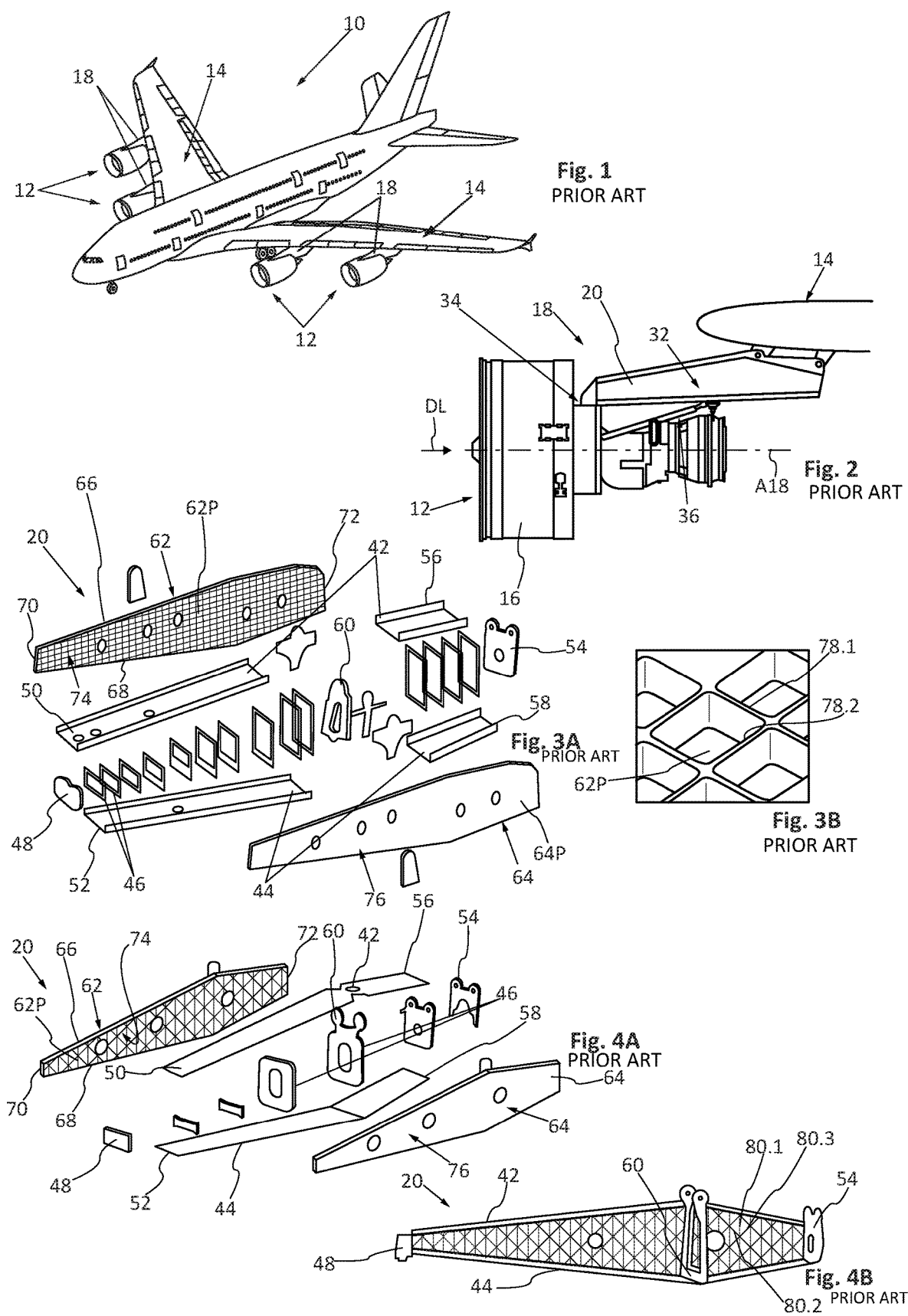

AIRCRAFT STRUT COMPRISING AT LEAST ONE LATERAL FRAME IN LATTICE FORM AND AIRCRAFT COMPRISING SAID STRUT

FIELD OF THE INVENTION

The present application relates to an aircraft strut comprising at least one lateral frame in the form of a lattice and an aircraft comprising said strut.

BACKGROUND OF THE INVENTION

According to a configuration that can be seen in FIGS. 1 and 2, an aircraft 10 comprises several engine assemblies 12 which are positioned under the wings 14 of the aircraft 10.

An engine assembly 12 comprises an engine 16, a nacelle (not represented in FIG. 2) positioned around the engine 16 and a strut 18 which ensures the link between the engine 16 and the rest of the aircraft 10, notably the wings 14.

Throughout the description, a longitudinal direction DL is a direction substantially parallel to the engine axis A18. A transverse plane is a plane at right angles to the engine axis A18. A longitudinal plane is a plane at right angles to a transverse plane. The concepts of front and rear refer to the direction of flow of the gases, the front corresponding to the intake of the gases (air) into the engine and the rear corresponding to the exhaust of the gases (combustion gases). The concept of vertical refers to the vertical direction when the aircraft is on the ground.

The strut 18 comprises a rigid primary structure 20 which ensures, among other things, the transmission of the loads between the engine 16 and the rest of the aircraft 10 and a secondary structure which jackets the primary structure 20 and which limits the drag of the strut.

The primary structure 20 of the strut 18 is linked on the one hand to the engine 16 by a link which comprises a rear engine attachment 32, a front engine attachment 34 and a pair of thrust connecting rods 36 which ensure the taking up of the thrust loads, and on the other hand, to the wing 14 by at least one front wing attachment 38 and one rear wing attachment 40.

According to embodiment configuration that can be seen in FIGS. 3A, 4A and 4B, the primary structure 20 comprises a top stringer 42, a bottom stringer 44, transverse frames 46 which link the top and bottom stringers 42, 44, which are arranged in transverse planes and which have square or rectangular sections.

The primary structure 20 also comprises a front end wall 48 which links a front end 50 of the top stringer 42 and a front end 52 of the bottom stringer 44 and a rear end wall 54 which links a rear end 56 of the top stringer 42 and a rear end 58 of the bottom stringer 44. The front and rear end walls 48 and 54 are arranged in transverse planes.

In a vertical longitudinal plane, the top stringer 42 has a profile in the form of an inverted V and the bottom stringer 44 has a profile in the form of a V. Thus, the transverse frames 46 have sections which progressively increase from the front end wall 48 to a central transverse frame 60 then which progressively decrease to the rear end wall 54.

In addition to the top and bottom stringers 42, 44, to the transverse frames 46, 60 and to the front and rear end walls 48, 54, the primary structure 20 comprises two lateral panels 62, 64 arranged on either side of the transverse frames 46, 60.

For the rest of the description, the concepts of interior and exterior refer to a so-called interior zone delimited by the top and bottom stringers 42, 44 and the lateral panels 62, 64, the rest of the space corresponding to an exterior zone.

Each lateral panel 62, 64 takes the form of a plate 62P, 64P delimited by a top edge 66 linked to the top stringer 42, a bottom edge 68 linked to the bottom stringer 44, a front end 70 linked to the front end wall 48, a rear end 72 linked to the rear end wall 54. Each panel 62 and 64 comprises an internal face 74 pressed against and linked to the transverse frames 46, 60 and an external face 76 opposite the internal face 74.

Each lateral panel 62, 64 is reinforced by a network of ribs arranged on at least one of the internal and/or external faces 74, 76, protruding from said internal and/or external face 74, 76.

According to a first configuration illustrated in FIG. 3B, the network of ribs is of ortho-grid type and comprises two series of ribs 78.1, 78.2, the ribs 78.1, 78.2 of one and the same series being parallel to one another and the ribs 78.1 of a first series being at right angles to the ribs 78.2 of the second series.

According to a second configuration that can be seen in FIG. 4B, the network of ribs is of iso-grid type and comprises three series of ribs 80.1, 80.2, 80.3, the ribs of one and the same series being parallel to one another and the ribs of one series forming an angle of 60° with the ribs of another series.

BACKGROUND OF THE INVENTION

The present invention proposes an alternative to the existing solutions that makes it possible to reduce the on-board weight with equivalent mechanical characteristics.

To this end, an embodiment of the invention is an aircraft strut comprising a primary structure which comprises:
  a top stringer,
  a bottom stringer,
  at least one transverse frame, arranged in a transverse plane, and which links the top stringer to the bottom stringer,
  a front end wall, arranged in a transverse plane, and which links a front end of the top stringer to a front end of the bottom stringer,
  a rear end wall arranged in a transverse plane, and which links a rear end of the top stringer to a rear end of the bottom stringer.

According to an embodiment of the invention, the primary structure comprises two lateral frames arranged on either side of the transverse frame, each lateral frame having a lattice form and comprising:
  a top beam linked to the top stringer and which extends from the front end wall to the rear end wall,
  a bottom beam linked to the bottom stringer and which extends from the front end wall to the rear end wall,
  angle ions which link the top beam and the bottom beam.

This configuration makes it possible, with equivalent mechanical characteristics, to reduce the weight of the primary structure and reduce its manufacturing costs.

According to another feature, the lateral frames are arranged in parallel longitudinal planes.

According to another feature, the top stringer has a profile in the form of an inverted V or U in a vertical longitudinal plane and the bottom stringer has a profile in the form of a V or U in a vertical longitudinal plane, the top beam comprises sections arranged end-to-end which form an inverted V or U identical to the inverted V or U profile of the top stringer and the bottom beam comprises sections arranged end-to-end which form a V or U identical to the V or U profile of the bottom stringer.

According to one configuration, each lateral frame comprises two angle ions arranged in the form of a V, first ends of the two angle ions being linked to the top beam at an area of join of the sections of the top beam, second ends of the two angle ions being linked to the bottom beam at a distance from an area of join of the sections of the bottom beam.

Preferably, each lateral frame comprises at least one end angle ion which links the rear end of the top beam and the rear end of the bottom beam.

According to one embodiment, each top and bottom beam has a section in the form of a T with a head arranged in a vertical longitudinal plane with an internal face oriented towards the interior of the primary structure and a leg at right angles to the head, linked to the internal face of the head and oriented towards the interior of the primary structure.

According to one embodiment, each angle ion has a section in the form of a T with a head arranged in a vertical longitudinal plane, pressed against the internal face of the head of the top and bottom beams and a leg at right angles to the head and oriented towards the interior of the primary structure.

According to another feature, the primary structure comprises a central transverse frame which comprises a top crossmember, a bottom crossmember, two lateral uprights and two eyelets linked to the top crossmember, arranged in vertical longitudinal planes, in the extension of the lateral uprights and each lateral frame comprises at least one eyelet arranged in a vertical longitudinal plane and linked to the top beam, each eyelet being substantially identical to the eyelets of the central transverse frame and offset towards the exterior of the primary structure relative to the eyelets.

Another subject of the invention is an aircraft comprising at least one strut according to the invention.

BRIEF DESCRIPTION OF THE DRAWINGS

Other features and advantages will emerge from the following description of the invention, description given purely as an example, in light of the attached drawings in which:

FIG. 1 is a perspective view of an aircraft,

FIG. 2 is a lateral view of a primary structure of a strut which links an engine to a wing, FIG. 3A is a perspective and exploded view of a primary structure of a strut which illustrates a first known configuration, FIG. 3B is a perspective view of a network of ribs which illustrates a known configuration, FIG. 4A is a perspective and exploded view of a primary structure of a strut which illustrates a second known configuration, FIG. 4B is a lateral view of the primary structure that can be seen in FIG. 4A.

DETAILED DESCRIPTION

Figure 5:
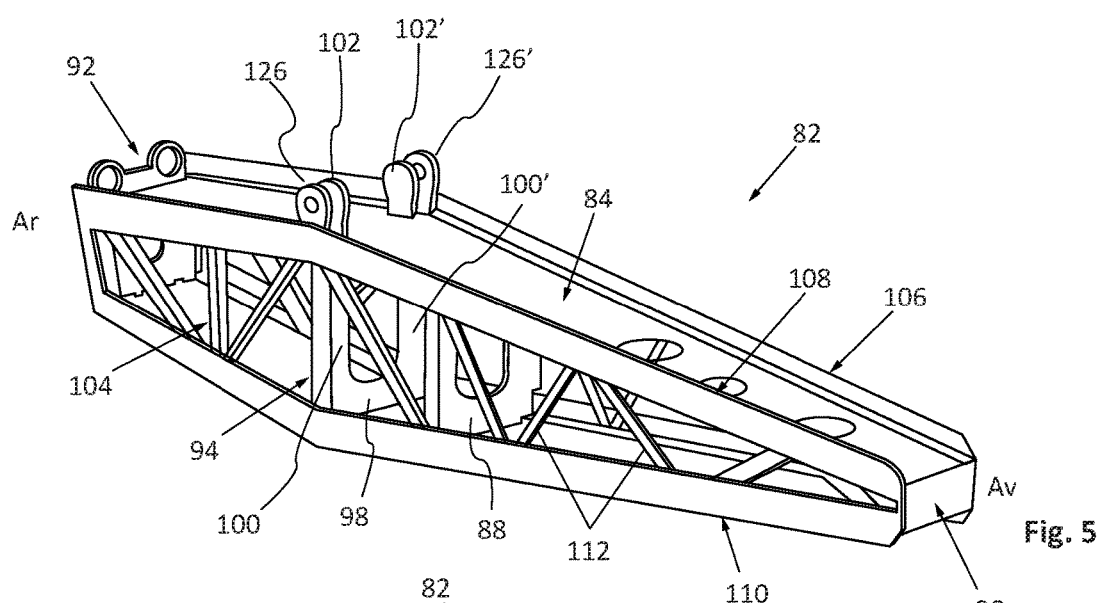
FIG. 5 is a perspective view of a primary structure of a strut which illustrates an embodiment of the invention from a first point of view.
Figure 6:
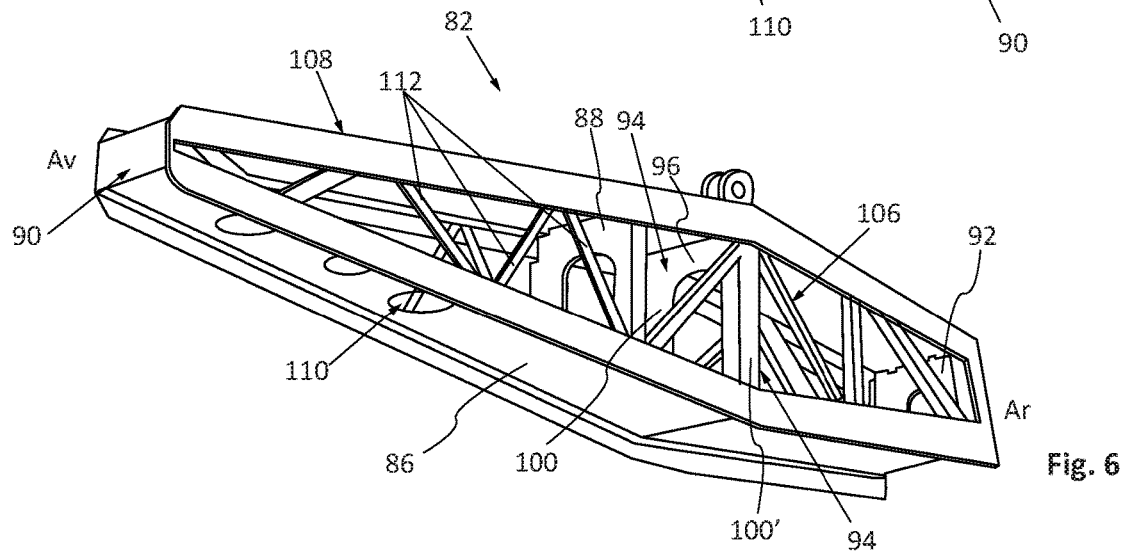
FIG. 6 is a perspective view of the primary structure that can be seen in FIG. 5 from a second point of view.

FIGS. 5 and 6 show a primary structure 82 of a strut according to an embodiment of the invention. In FIGS. 5 and 6, the front area is referenced Av and the rear area Ar.

This primary structure 82 comprises a top stringer 84, a bottom stringer 86, at least one transverse frame 88 which links the top stringer 84 and the bottom stringer 85, a front end wall 90 which links a front end of the top stringer 84 and a front end of the bottom stringer 86 and a rear end wall 92 which links a rear end of the top stringer 84 and a rear end of the bottom stringer 86. These elements are not described further because they may be identical to those of the prior art. According to one embodiment, the primary structure 82 comprises a so-called central transverse frame 94. This central transverse frame 94 comprises a top crossmember 96, a bottom crossmember 98, two lateral uprights 100, 100' and two eyelets 102, 102' linked to the top crossmember 96, arranged in vertical longitudinal planes, in the extension of the lateral uprights 100, 100'.

According to one embodiment, the primary structure 82 also comprises the central transverse frame 94, a transverse frame 88 positioned between the central transverse frame 94 and the front end wall 90.

According to one embodiment, the top stringer 84 is a plate with a profile in the form of an inverted V in a vertical longitudinal plane and the bottom stringer 86 is a plate with a profile in the form of a V in a vertical longitudinal plane. Thus, the separation between the top stringer 84 and the bottom stringer 86 increases from the front end wall 90 to the central transverse frame 94 then decreases to the rear end wall 92. In a variant, the top stringer 84 has a profile in the form of an inverted U and the bottom stringer 86 has a profile in the form of a U.

According to an embodiment of the invention, the primary structure 82 comprises two lateral frames 104 and 106 arranged on either side of the transverse frame 88 and/or of the central transverse frame 94, in two vertical and parallel longitudinal planes.

Each lateral frame 104, 106 has a lattice form and comprises a top beam 108 linked to the top stringer 84 and which extends from the front end wall 90 to the rear end wall 92, a bottom beam 110 linked to the bottom stringer 86 and which extends from the front end wall 90 to the rear end wall 92 and angle ions 112 which link the top beam 108 and the bottom beam 110.

The top beam 108 comprises sections 108.1 and 108.2 arranged end-to-end which form an inverted V or U identical to the profile of the top stringer 84. The bottom beam 110 comprises sections 110.1 and 110.2 arranged end-to-end which form a V or U identical to the profile of the bottom stringer 86.

The section of the top and bottom beams 108, 110, the position and the section of each angle ion 112 are determined as a function of the loads which pass between the top and bottom beams 108, 110, and in particular the value of these loads and the load areas in which these loads pass. As an example, the loads and the load areas are determined by a digital simulation. According to some embodiments, dependent in particular on the assembly of the aircraft strut with the engine assembly 12 and on the determined load areas, one or more angle ions 112 are substantially diagonal relative to the top and bottom beam 108 and 110, that is to say that they are not at right angles to said beams 108 and 110, corresponding to the direction of the loads created between said beams 108 and 110. The angle ions 112 and the bottom and top beams 112 consequently form a triangle structure.

Figure 7:
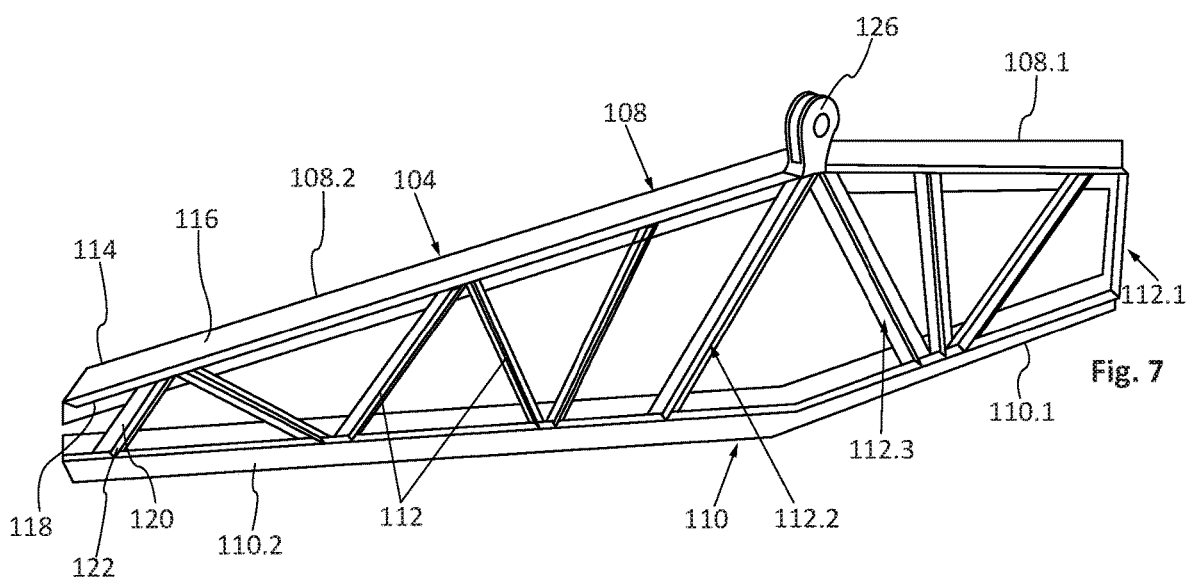
FIG. 7 is a perspective view of a lateral frame of the primary structure that can be seen in FIGS. 5 and 6.

According to an embodiment that can be seen in FIG. 7, each top and bottom beam 108, 110 has a section in the form of a T with a head 114 arranged in a vertical longitudinal plane with a face, called internal face 116 and designed to be oriented towards the interior of the primary structure 82, after the assembly of the primary structure 82, and a leg 118 at right angles to the head 114, linked to the internal face 116 of the head 114 and designed to be oriented towards the interior of the primary structure 82, after the assembly of the primary structure 82.

According to one embodiment, each angle ion 112 has a section in the form of a T with a head 120 arranged in a vertical longitudinal plane, pressed against the internal face 116 of the head 114 of the top and bottom beams 108, 110 and a leg 122 at right angles to the head 120 and designed to be oriented towards the interior of the primary structure 82, after the assembly of the primary structure 82.

According to one embodiment, each lateral frame 104, 106 comprises at least one end angle ion 112.1 which links the rear end of the top beam 108 and the rear end of the bottom beam 110.

According to one configuration, each lateral frame 104, 106 comprises two angle ions 112.2, 112.3 arranged in the form of a V, the first ends of the two angle ions 112.2 and 112.3 being linked to the top beam 108 at the area of join of the sections 108.1 and 108.2, the second ends of the two angle ions 112.2 and 112.3 being linked to the bottom beam at a distance from the area of join of the sections 110.1 and 110.2.

According to one embodiment, each lateral frame 104, 106 comprises at least one eyelet 126, 126' arranged in a vertical longitudinal plane and linked to the top beam 108. Each eyelet 126, 126' is substantially identical to the eyelets 102, 102' of the central transverse frame 94 and offset towards the exterior of the primary structure 82 relative to the eyelets 102, 102'. The eyelets 126, 126' of the top beams 108 of the lateral frames and the eyelets 102, 102' of the central transverse frame 94 form a front wing attachment.

The beams 108, 110 and the angle ions 112 can be obtained by extrusion, by welding plates by laser beam, by machining from bulk or by casting and can be assembled by bolting, by welding, by riveting or similar.

The lateral frames 104, 106 are linked to the top 84 and bottom 86 stringers and to the transverse frames 88 by any appropriate means, such as by bolting, by welding, by riveting or similar.

The invention makes it possible to obtain a weight saving of the order of 7 to 10% for each lateral frame 104, 106 compared to a lateral panel of the prior art, a manufacturing cost saving of the order of 20 to 30%, a better accessibility to the interior of the primary structure because the lateral frames are largely open work.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft strut comprising:
   a primary structure comprising:
      a top stringer;
      a bottom stringer;
      at least one transverse frame, arranged in a transverse plane, and linking the top stringer to the bottom stringer;
      a front end wall, arranged in a transverse plane, and linking a front end of the top stringer to a front end of the bottom stringer; and
      a rear end wall arranged in a transverse plane, and linking a rear end of the top stringer to a rear end of the bottom stringer,
   wherein the primary structure comprises:
      two lateral frames arranged on either side of the transverse frame, each lateral frame having a lattice form and comprising an top beam linked to the top stringer and extending from the front end wall to the rear end wall;
      a bottom beam linked to the bottom stringer and extending from the front end wall to the rear end wall; and
      angled ions linking the top beam and the bottom beam, angled ions inclined at an angle relative to the top beam and the bottom beam,
   wherein each top and bottom beam has a section in the form of a T with a head arranged in a vertical longitudinal plane with an internal face oriented towards the interior of the primary structure and a leg at right angles to the head, linked to the internal face of the head and oriented towards the interior of the primary structure.

2. The strut according to claim 1, wherein the lateral frames are arranged in parallel longitudinal planes.

3. The strut according to claim 1, wherein each lateral frame comprises at least one end angle ion linking the rear end of the top beam and the rear end of the bottom beam.

4. The strut according to claim 1, wherein each angle ion has a section in the form of a T with a head arranged in a vertical longitudinal plane, pressed against the internal face of the head of the top and bottom beams and a leg at right angles to the head and oriented towards the interior of the primary structure.

5. The strut according to claim 1, wherein the primary structure comprises a central transverse frame comprising:
   a top crossmember;
   a bottom crossmember;
   two lateral uprights; and
   two eyelets linked to the top crossmember, arranged in vertical longitudinal planes, in the extension of the lateral uprights, and
   wherein each lateral frame comprises at least one eyelet arranged in a vertical longitudinal plane and linked to the top beam, each eyelet being identical to the eyelets of the central transverse frame and offset towards the exterior of the primary structure relative to the eyelets.

6. An aircraft strut comprising:
   a primary structure comprising:
      a top stringer;
      a bottom stringer;
      at least one transverse frame, arranged in a transverse plane, and linking the top stringer to the bottom stringer;
      a front end wall, arranged in a transverse plane, and linking a front end of the top stringer to a front end of the bottom stringer; and
      a rear end wall arranged in a transverse plane, and linking a rear end of the top stringer to a rear end of the bottom stringer, wherein the primary structure comprises:
two lateral frames arranged on either side of the transverse frame, each lateral frame having a lattice form and comprising an top beam linked to the top stringer and extending from the front end wall to the rear end wall;
a bottom beam linked to the bottom stringer and extending from the front end wall to the rear end wall; and
angled ions linking the top beam and the bottom beam,
wherein the top stringer has a profile in the form of an inverted V or U in a vertical longitudinal plane and the bottom stringer has a profile in the form of a V or U in a vertical longitudinal plane,
wherein the top beam comprises sections arranged end-to-end forming an inverted V or U identical to the inverted V or U profile of the top stringer, and
wherein the bottom beam comprises sections arranged end to end forming a V or U identical to the V or U profile of the bottom stringer.

7. The strut according to claim 6, wherein each lateral frame comprises two angle ions arranged in the form of a V, first ends of the two angle ions being linked to the top beam at an area of join of the sections of the top beam, second ends of the two angle ions being linked to the bottom beam at a distance from an area of join of the sections of the bottom beam.

8. An aircraft comprising at least one strut comprising:
a primary structure comprising:
a top stringer;
a bottom stringer;
at least one transverse frame, arranged in a transverse plane, and linking the top stringer to the bottom stringer;
a front end wall, arranged in a transverse plane, and linking a front end of the top stringer to a front end of the bottom stringer; and
a rear end wall arranged in a transverse plane, and linking a rear end of the top stringer to a rear end of the bottom stringer,
wherein the primary structure comprises:
two lateral frames arranged on either side of the transverse frame, each lateral frame having a lattice form and comprising an top beam linked to the top stringer and extending from the front end wall to the rear end wall;
a bottom beam linked to the bottom stringer and extending from the front end wall to the rear end wall; and
angled ions linking the top beam and the bottom beam,
wherein each top and bottom beam has a section in the form of a T with a head arranged in a vertical longitudinal plane with an internal face oriented towards the interior of the primary structure and a leg at right angles to the head, linked to the internal face of the head and oriented towards the interior of the primary structure.

* * * * *